US008889989B2

(12) United States Patent
Maher (10) Patent No.: US 8,889,989 B2
(45) Date of Patent: Nov. 18, 2014

(54) ELASTOMERIC CABLE ADAPTERS FOR POWER TRANSMISSION CABLES AND COVER ASSEMBLIES AND METHODS INCLUDING THE SAME

(75) Inventor: Kathryn Marie Maher, Cary, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 189 days.

(21) Appl. No.: 13/617,930

(22) Filed: Sep. 14, 2012

(65) Prior Publication Data

US 2014/0076627 A1    Mar. 20, 2014

(51) Int. Cl.
*H02G 15/04*    (2006.01)
*H01B 13/22*    (2006.01)

(52) U.S. Cl.
USPC ....... 174/77 R; 174/107; 174/68.1; 174/72 A; 439/586; 138/109

(58) Field of Classification Search
USPC .............. 174/77 R, 107, 68.1, 68.3, 72 A, 93, 174/88 R, 73.1, 88 C, 74 A, 74 R, 19, 21 R; 439/587, 586, 936, 523, 502, 901, 736, 439/738; 138/103, 109, 118, 122, 149
See application file for complete search history.

(56) References Cited

U.S. PATENT DOCUMENTS

| | | | |
|---|---|---|---|
| 6,103,975 A * | 8/2000 | Krabs et al. ................. | 174/74 A |
| 7,476,114 B1 * | 1/2009 | Contreras ..................... | 439/901 |
| 7,511,222 B2 * | 3/2009 | Taylor et al. ................. | 174/84 R |
| 7,728,227 B2 * | 6/2010 | Portas et al. ................. | 174/73.1 |
| 7,863,521 B2 * | 1/2011 | Campbell et al. ............... | 174/93 |
| 7,901,243 B1 | 3/2011 | Yaworski | |
| 7,938,682 B2 | 5/2011 | Su | |

(Continued)

FOREIGN PATENT DOCUMENTS

| | | |
|---|---|---|
| CN | 2 627 669 Y | 7/2004 |
| EP | 0 691 721 A1 | 1/1996 |
| WO | WO 2009/006136 A2 | 1/2009 |

OTHER PUBLICATIONS

Notification of Transmittal of the International Search Report and the Written Opinion of the International Searching Authority, or the Declaration in corresponding PCT Application No. PCT/US2013/059143 mailed Jan. 31, 2014 (14 pages).

(Continued)

*Primary Examiner* — Angel R Estrada
(74) *Attorney, Agent, or Firm* — Myers Bigel Sibley & Sajovec, PA (57) ABSTRACT

A cable adapter unit for building up an outer diameter of an electrical cable to facilitate fitment of a cold-shrinkable cover sleeve body on the electrical cable includes a cold-shrinkable, tubular, elastomeric cable adapter and a removable holdout. The cable adapter defines a cable adapter through passage configured to receive the electrical cable. The cable adapter includes: an integral, electrically conductive, tubular stress cone layer; and an electrically insulating, tubular outer layer integral with and surrounding the stress cone layer. The stress cone layer and the outer layer each define a portion of the through passage. The holdout is mounted within the through passage and is configured to be withdrawn therefrom. The holdout maintains the cable adapter in an expanded state in which the cable adapter is elastically expanded and, when withdrawn from the through passage, permits the cable adapter to radially contract to a contracted state about the electrical cable.

22 Claims, 6 Drawing Sheets

(56) References Cited

U.S. PATENT DOCUMENTS 8,030,570 B2 * 10/2011 Seraj et al. .................. 174/93
8,043,102 B2    10/2011 Lu et al.
8,502,076 B2 *  8/2013 Luzzi ........................... 174/93

OTHER PUBLICATIONS

ELB-35-600, ELB-35-610, 600A T-Body Elbow Connectors for Copper Tape (CT), Jacketed Concentric Neutral (JCN), and Concentric Neutral (CN) cables up to 35kV class TE Connectivity Energy, PII 55900, PCN BQ5477-000, Effective Date: Sep. 28, 2011 (12 pages).

"HVE-1590 Series PILC Adapter for Use With 600 AMP Push-on Elbows" Raychem, Tyco Electronics-Energy, PII-55009 Rev AC, PCN 614371-000, Effective Date: Apr. 26, 2000 (7 pages).

"RSTI-L Screened, separable connection system 630 A up to 24 kV" Tyco Electronics Raychem GmbH, Energy Division, Tyco Electronics Corporation EPP 053, Apr. 2004 (4 pages).

* cited by examiner

ELASTOMERIC CABLE ADAPTERS FOR POWER TRANSMISSION CABLES AND COVER ASSEMBLIES AND METHODS INCLUDING THE SAME

FIELD OF THE INVENTION

The present invention relates to electrical cables and connections and, more particularly, to protective covers for electrical cables and electrical connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector or termination. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

In order to protect the electrical connection (e.g., cable(s) and connector) from the environment (e.g., moisture) and to protect technicians from the electrically energized components, joint or termination cover sleeve systems are employed. Typically, the cover sleeve system includes a relatively stiff push-on sleeve (e.g., a straight tube or elbow) formed of EPDM rubber and a plurality of push-on cable adapters having a given outer diameter and different inner diameters. The sleeve has an effectively fixed inner diameter and a cable adapter of appropriate outer diameter is selected to build up the outer diameter of the cable to suitably fit the inner diameter of the sleeve. The cable adapter is forcibly pushed onto the cable and the sleeve is forcibly pushed onto the cable adapter and the connector to span the connection and overlap the insulation layers of the cable and the connector.

Cover sleeve systems as described can suffer several significant drawbacks. For example, because the push-on cable adapters each have a limited cable diameter use range, multiple different sizes of cable adapters are required to cover many intended use ranges. The cable adapters may be difficult to push on.

SUMMARY OF THE INVENTION

According to embodiments of the present invention, a cable adapter unit for building up an outer diameter of an electrical cable to facilitate fitment of a cold-shrinkable cover sleeve body on the electrical cable includes a cold-shrinkable, tubular, elastomeric cable adapter and a removable holdout. The cable adapter defines a cable adapter through passage configured to receive the electrical cable. The cable adapter includes: an integral, electrically conductive, tubular stress cone layer; and an electrically insulating, tubular outer layer integral with and surrounding the stress cone layer. The stress cone layer and the outer layer each define a portion of the through passage. The holdout is mounted within the through passage and is configured to be withdrawn therefrom. The holdout maintains the cable adapter in an expanded state in which the cable adapter is elastically expanded and, when withdrawn from the through passage, permits the cable adapter to radially contract to a contracted state about the electrical cable.

According to embodiments of the present invention, a cover system for use with an electrical cable to form a protected cable assembly includes a cable adapter unit and a cold-shrinkable, tubular, elastomeric cover sleeve body. The cable adapter unit includes a cold-shrinkable, tubular, elastomeric cable adapter and a removable holdout. The cable adapter defines a cable adapter through passage configured to receive the electrical cable. The cable adapter includes: an integral, electrically conductive, tubular stress cone layer; and an electrically insulating, tubular outer layer integral with and surrounding the stress cone layer. The stress cone layer and the outer layer each define a portion of the through passage. The removable holdout is mounted within the through passage and is configured to be withdrawn therefrom. The holdout maintains the cable adapter in an expanded state in which the cable adapter is elastically expanded and, when withdrawn from the through passage, permits the cable adapter to radially contract to a contracted state about the electrical cable. The cover sleeve body defines a cover passage. The cover sleeve body is configured to be mounted on the electrical cable such that the electrical cable and the cable adapter are received in the cover passage and the cover sleeve body sealingly engages the cable adapter.

According to method embodiments of the present invention, a method for use with an electrical cable for forming a protected cable assembly includes providing a cable adapter unit including: a cold-shrinkable, tubular, elastomeric cable adapter defining a cable adapter through passage configured to receive the electrical cable; and a removable holdout mounted within the through passage and configured to be withdrawn therefrom, wherein the holdout maintains the cable adapter in an expanded state in which the cable adapter is elastically expanded and, when withdrawn from the through passage, permits the cable adapter to radially contract to a contracted state about the electrical cable. The cable adapter includes: an integral, electrically conductive, tubular stress cone layer; and an electrically insulating, tubular outer layer integral with and surrounding the stress cone layer. The stress cone layer and the outer layer each define a portion of the through passage. The method further includes: positioning the cable adapter unit on an electrical cable; withdrawing the holdout from the through passage to thereby release the cable adapter onto the electrical cable; providing a cold-shrinkable, tubular, elastomeric cover sleeve body defining a cover passage; and mounting the cover sleeve body the electrical cable such that the electrical cable and the cable adapter are received in the cover passage and the cover sleeve body sealingly engages the cable adapter.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

As used herein, "cold-applied", "cold-applied cover", or "cold-applied cable adapter" means that the component can be assembled or installed about a substrate (e.g., a cable) without requiring the use of applied heat at the time of installation.

As used herein, "cold shrink", "cold shrink cover", or "cold-shrink cable adapter" means that the component can be shrunk or contracted about a substrate (e.g., a cable) without requiring the use of applied heat.

Figure 6:
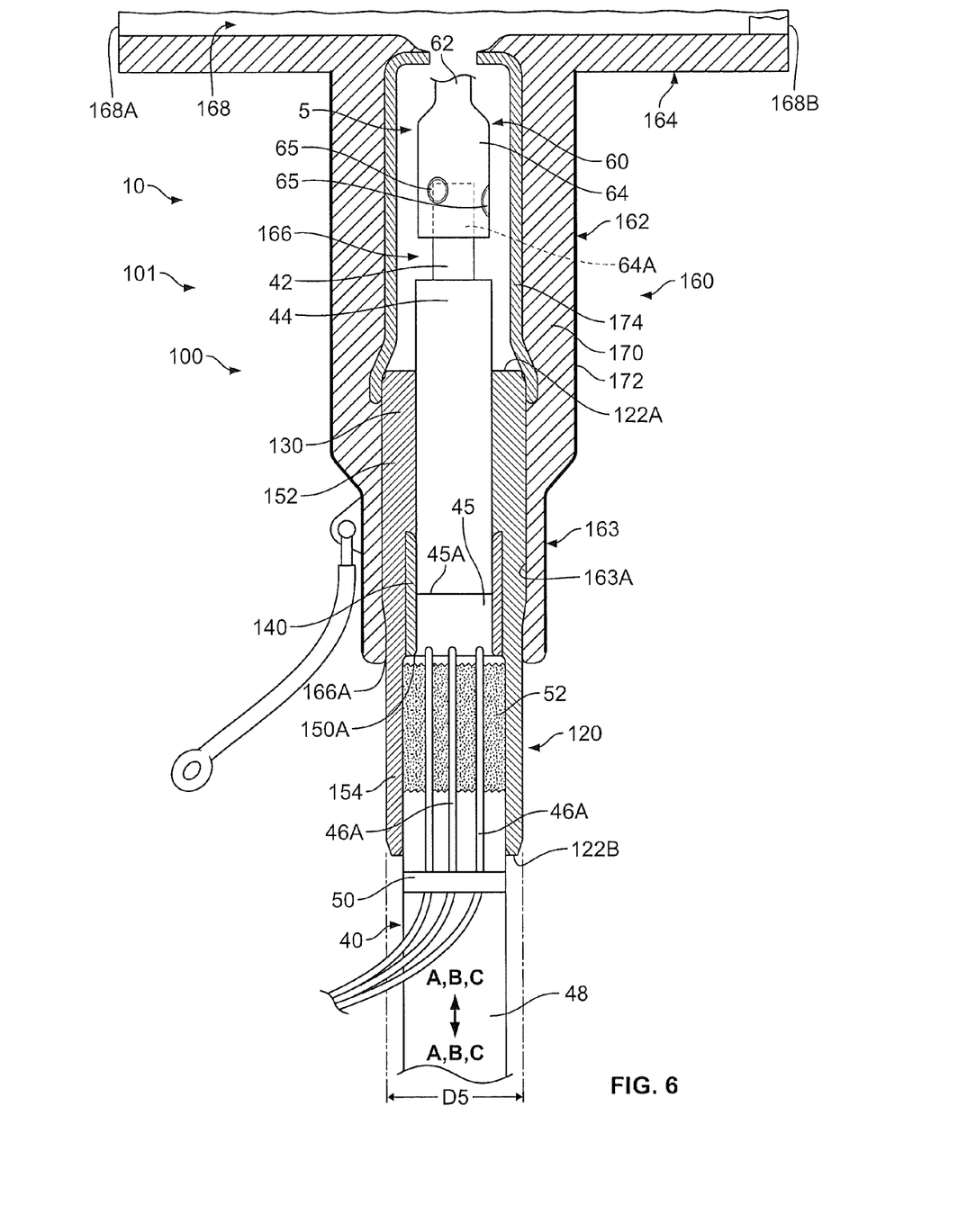
FIG. 6 is a fragmentary, cross-sectional view of a protected cable assembly including the cable adapter of FIG. 1 and the cable of FIG. 5.

With reference to FIG. 6, a cover system 101 according to some embodiments of the present invention is shown therein. The cover system 101 may be used to form a protected cable assembly 10 including a terminated (or spliced) cable 40, a termination or connector 60, and a cover assembly 100 according to embodiments of the present invention. In some embodiments, the cover system 101 or a portion thereof is provided as a pre-packaged kit of components for subsequent use and assembly by an installer (e.g., a field installer) using a method as described herein. The cover system 101 includes a cold-shrinkable cable adapter 120, a push-on elastomeric cover sleeve body in the form of an elbow body 160, and a connector 60.

Figure 1:
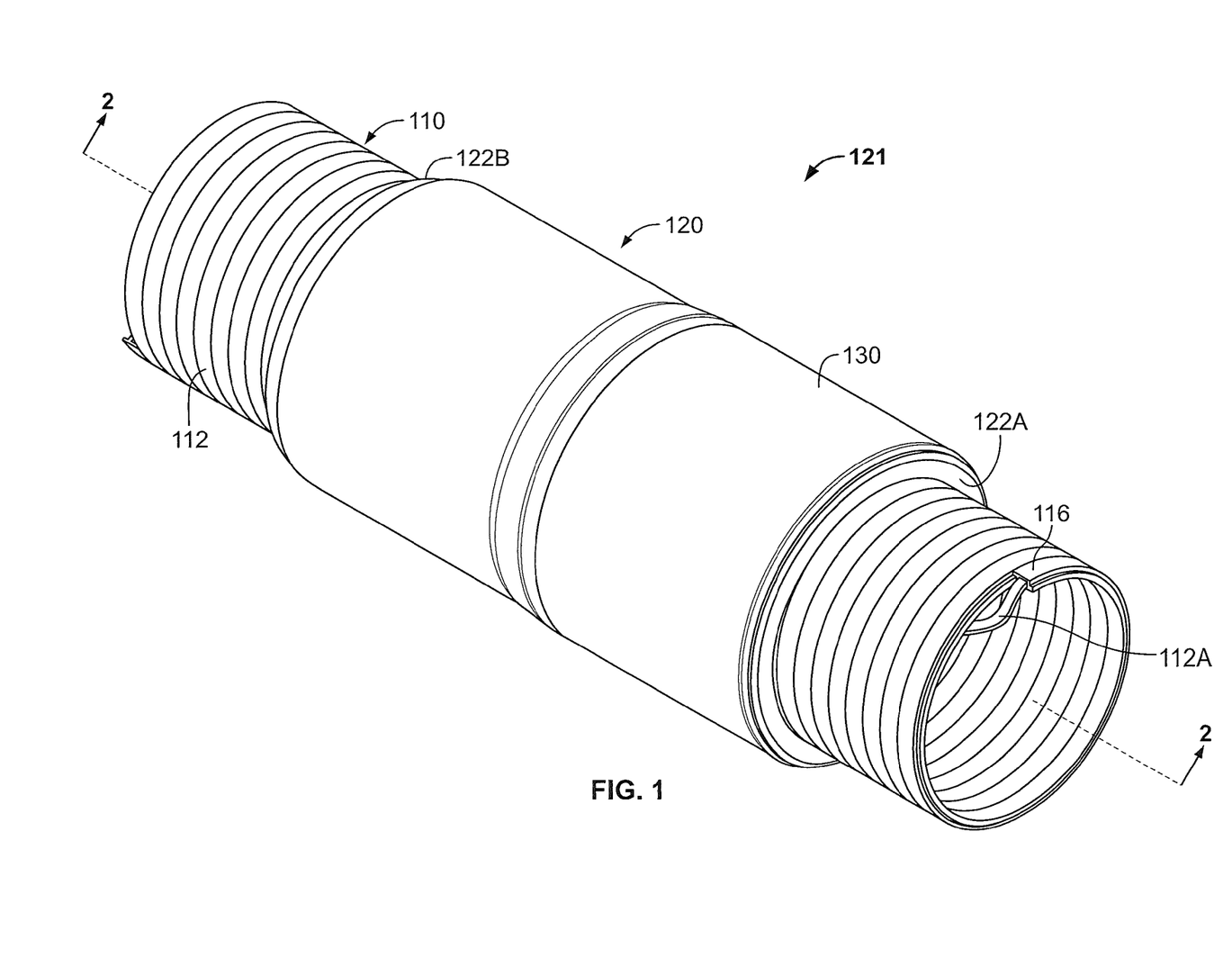
FIG. 1 is a perspective view of a pre-expanded unit including a cold-shrinkable cable adapter according to embodiments of the present invention.
Figure 2:
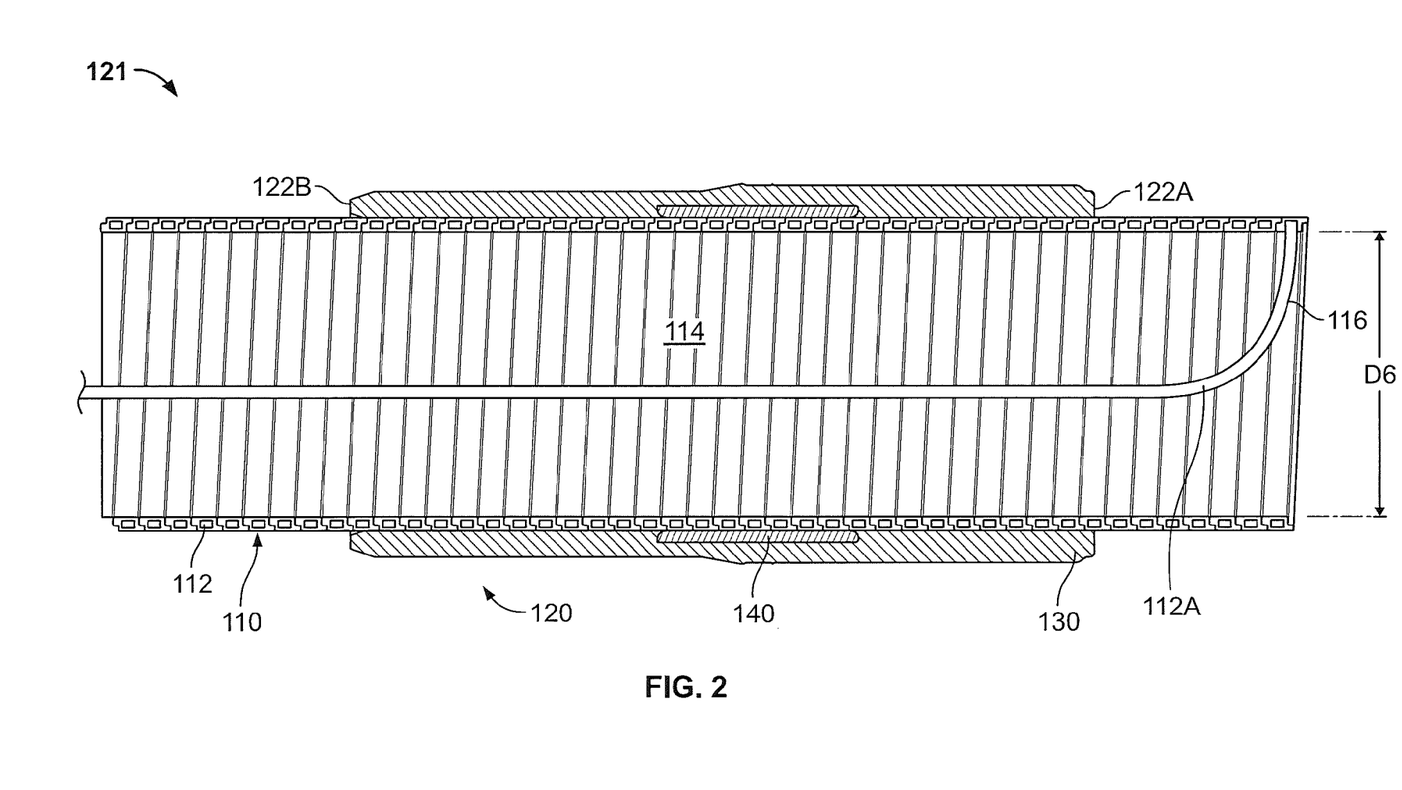
FIG. 2 is a cross-sectional view of the pre-expanded unit of FIG. 1 taken along the line 2-2 of FIG. 1.
Figure 3:
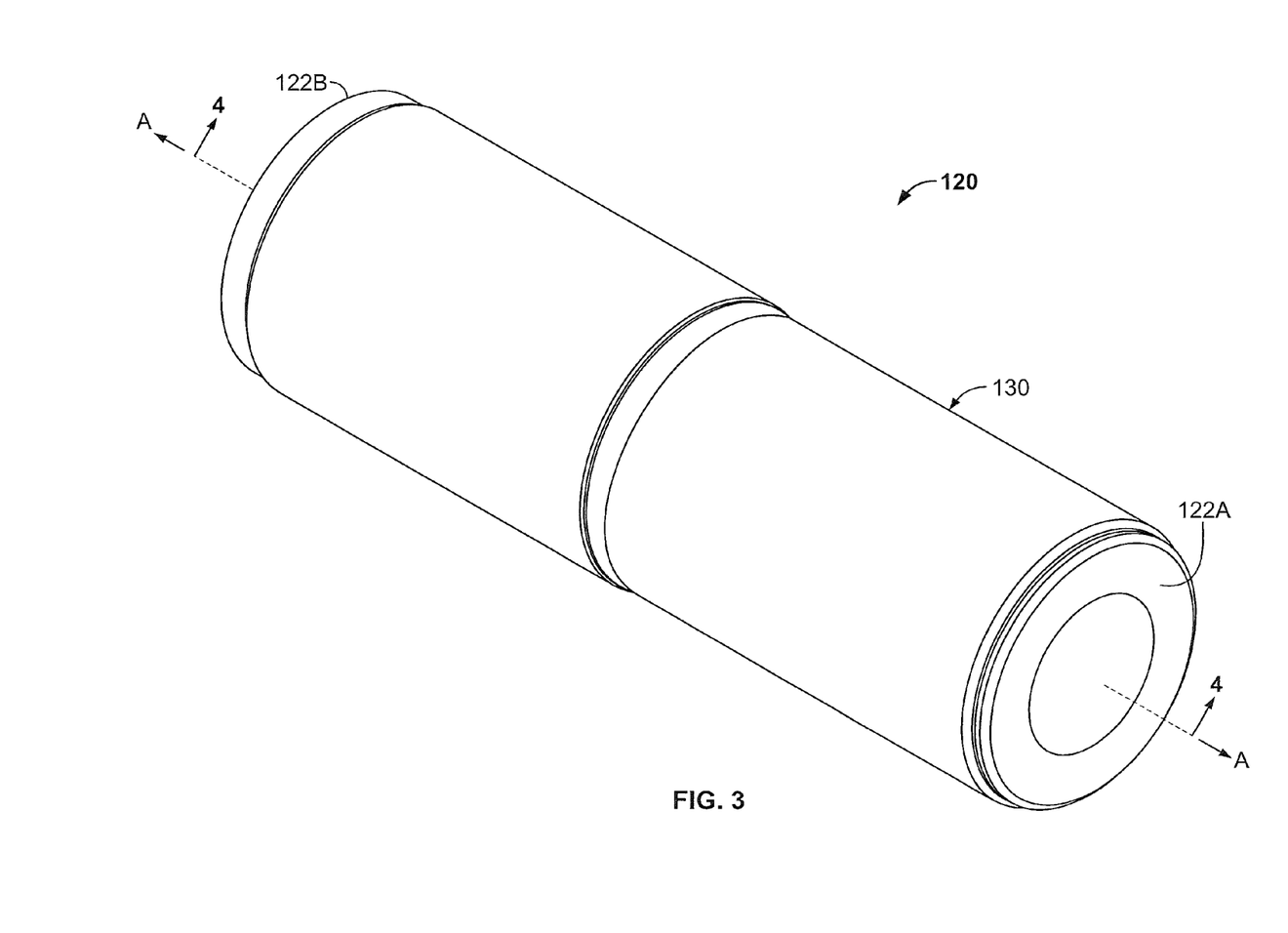
FIG. 3 is a perspective view of the cable adapter of FIG. 1 in a relaxed state.

The cable adapter 120 is provided as a pre-expanded unit 121 including a holdout device 110 and the cable adapter 120 mounted thereon in an expanded state or position as shown in FIGS. 1 and 2. The cable adapter 120 includes an outer, electrically insulating sleeve or layer 130 and an integral electrically conductive (e.g. semiconductive) stress cone layer 140. The layers 130 and 140 are thus formed of electrically and functionally dissimilar materials.

The cable adapter 120 has opposed inner and outer surfaces 120A and 120B, and opposed ends 122A, 122B. The cable adapter 120 is tubular and defines an axially extending conductor through passage 126 that communicates with opposed end openings 124A, 124B and defines a cable adapter axis A-A.

An annular inner step 150 is defined in the passage 126 by an annular, radially extending step face 150A. The step 150 divides the cable adapter 120 into a front section 152 (defining a subpassage 126A) and a rear section 154 (defining a subpassage 126B).

The outer, electrically insulating layer 130 has opposed inner and outer surfaces 130A and 130B, and opposed ends 132A, 132B. The outer layer 130 is tubular and defines an axially extending conductor through passage 136 that communicates with the opposed end openings 124A, 124B.

The outer layer 130 can be formed of any suitable elastically expandable, dielectric or electrically insulative material. According to some embodiments, the outer layer 130 has a Modulus at 100 percent elongation (M100) in the range of from about 0.4 to 0.8 MPa. According to some embodiments, the outer layer 130 has an M100 in the range of from about 0.5 to 0.6 MPa. According to some embodiments, the outer layer 130 has an elongation at break of at least 400 percent, measured according to ASTM Standard D412-06. According to some embodiments, the outer layer 130 is formed of an elastomeric material. According to some embodiments, the outer layer 130 is formed of liquid silicone rubber (LSR). Other suitable materials may include formulations of EPDM or ethylene propylene rubber (EPR) having an M100 in the prescribed range.

The stress cone layer 140 is a generally tubular sleeve bonded to the inner surface 130A of the outer layer 130 in a midsection thereof. The outer layer 130 and the stress cone layer 140 collectively form a unitary structure.

The stress cone layer 140 has opposed inner and outer surfaces 140A and 140B, and opposed end faces 142A, 142B. The stress cone layer 140 is tubular and defines an axially extending conductor through passage 146 that defines, in part, the passage 126. The end face 142A is bonded to the outer layer 130. The end face 142B forms some or all of the step face 150A.

The stress cone layer 140 may be formed of a suitable electrically conductive, elastically expandable material. According to some embodiments, the stress cone layer 140 is formed of a material having a Modulus at 100 percent elongation (M100) in the range of from about 0.7 to 1.2 MPa. According to some embodiments, the stress cone layer 140 has an elongation at break of at least 400 percent, measured according to ASTM Standard D412-06. According to some embodiments, the stress cone layer 140 is formed of an elastomeric material. According to some embodiments, the stress cone layer 140 is formed of liquid silicone rubber (LSR). Other suitable materials may include formulations of EPDM or ethylene propylene rubber (EPR) having an M100 in the prescribed range. The LSR or other elastomeric material may include an electrically conductive filler material such as carbon black, for example.

Figure 4:
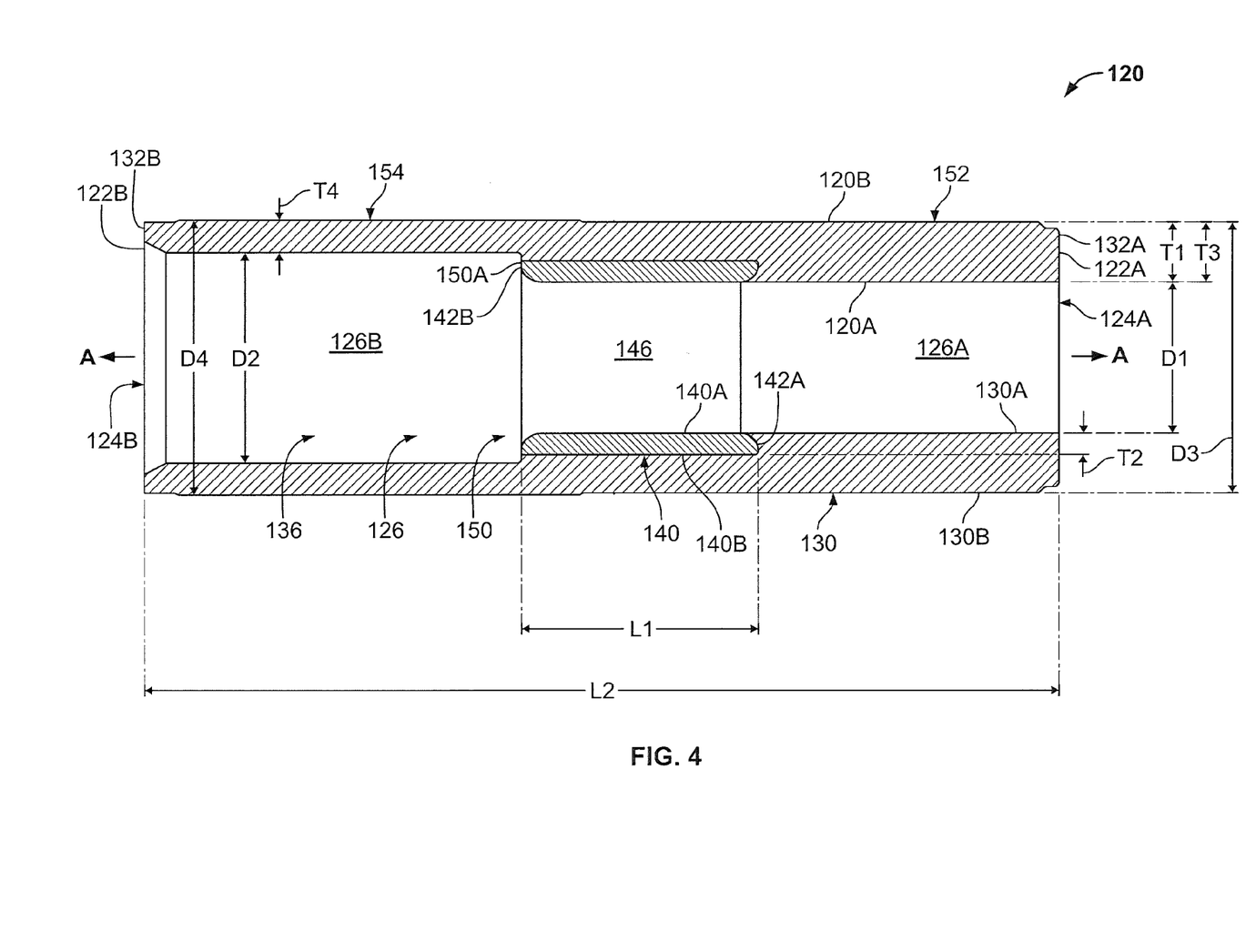
FIG. 4 is a cross-sectional view of the cable adapter of FIG. 3 taken along the line 4-4 of FIG. 3.

As best seen in FIG. 4, when the cable adapter 120 is relaxed (i.e., not mounted on the holdout 110 or a cable), the thickness of the cable adapter 120 varies along its length while the outer diameter of the cable adapter 120 varies very little or not at all (i.e., is substantially uniform) across at least the sections 152 and 154, and, as illustrated, from end 122A to end 122B. That is, the outer diameter is substantially uniform while the inner diameter varies substantially. It will be appreciated that this differential will likewise exist when the cable adapter 120 is radially expanded by fitment on a cable, though its extent may be somewhat reduced by such expansion.

According to some embodiments, the maximum thickness T1 (FIG. 4) of the outer layer 130 is in the range of from about 8 to 20 mm.

According to some embodiments, the thickness T2 (FIG. 4) of the stress cone 140 is in the range of from about 3.5 to 5 mm. According to some embodiments, the length L1 (FIG. 4) of the stress cone 140 is in the range of from about 50 to 55 mm.

According to some embodiments, the thickness T3 (FIG. 4) of the cable adapter section 152 is in the range of from about 8 to 20 mm. According to some embodiments, the thickness T4 (FIG. 4) of the cable adapter section 154 is in the range of from about 4 to 15 mm. According to some embodiments, the ratio of the thickness T3 to the thickness T4 is in the range of from about 1.25 to 2.25 mm.

According to some embodiments, the length L2 (FIG. 4) of the cable adapter 120 is in the range of from about 140 to 175 cm.

According to some embodiments, the inner diameter D1 (FIG. 4) of the section 152 is in the range of from about 10 to 35 mm. According to some embodiments, the inner diameter D2 (FIG. 4) of the section 154 is in the range of from about 20 to 50 mm. According to some embodiments, the inner diameter D2 is between about 5 and 20 mm greater than the inner diameter D1.

According to some embodiments, the outer diameter D3 (FIG. 4) of the section 152 is in the range of from about 35 to 65 mm. According to some embodiments, the outer diameter D4 (FIG. 4) of the section 154 and the outer diameter D3 differ from one another than no more than about 0.5 mm.

According to some embodiments, the outer diameter of the cable adapter 120, when relaxed (i.e., not mounted on the holdout 110 or a cable) is substantially uniform across the sections 152, 154, and, according to some embodiments from end 120A to end 120B. According to some embodiments, the relaxed outer diameter of the cable adapter 120 does not vary by more than 5 percent across the sections 152, 154, and, according to some embodiments, from end 120A to end 120B.

The cable adapter 120 may be formed by any suitable method and apparatus. According to some embodiments, the stress cone layer 140 is molded and the outer layer 130 is thereafter inserted over molded about the stress cone layer 140. According to some embodiments, the outer layer 130 and the stress cone layer 140 are each monolithic.

The holdout 110 (FIGS. 1 and 2) is a disintegratable or collapsible rigid tube. According to some embodiments, the holdout 110 includes a strip 112 helically wound to form a rigid cylinder. The holdout 110 defines a through passage 114 having an inner diameter D6 (FIG. 2). According to some embodiments, the inner diameter D6 of the holdout 110 is in the range of from about 50 to 125 mm. A section 112A of the strip 112 is routed back through the through passage 114.

The holdout device 110 may be factory installed. In some embodiments, the cable adapter 120 is formed and thereafter expanded, placed about the holdout 110 and permitted to contract onto the holdout 110.

The holdout 110 retains the cable adapter 120 in an elastically, radially expanded state. According to some embodiments, when the cable adapter 120 is on the holdout 110, the inner diameter of the section 154 is between about 100 to 300 percent of the inner diameter of the section 154 when relaxed (i.e., not on a substrate).

The holdout 110 can be formed of any suitable material. According to some embodiments, the holdout 110 is formed of plastic, such as a polyolefin. Suitable polyolefins may include high density polyethylene (HDPE), low density polyethylene (LDPE), or polypropylene.

The elbow body 160 may be of any suitable construction. The elbow body 160 includes a tubular main leg 162 and a tubular cross leg 164. The legs 162, 164 define respective, intersecting inner passages 166 and 168. The passage 166 defines an elbow main axis B-B. The cross leg 164 has a first opening 168B to receive a bushing, for example, and an opposed opening 168A to permit access to a test lug, for example. The main leg 162 has an end opening 166A through which the cable 40 is received to position the connector 60 in the passage 166. An end section 163 of the main leg 162 is located adjacent the opening 166A. The end section 163 has an inner surface 163A with an inner diameter D5 (FIG. 6). According to some embodiments, the diameter D5 is in the range of from about 50 to 95 mm.

According to some embodiments and as illustrated, the elbow body 160 includes an electrically insulating layer 170, an outer electrically conductive shield screen or layer 172, and an inner electrically conductive shield screen or layer 174. The insulation layer 170 may be formed of an elastomer. According to some embodiments, the insulation layer 170 is formed of EPDM. According to some embodiments, the insulation layer 170 is formed of LSR. Other suitable materials may include neoprene, silicone rubber or other rubber. The screen layers 172, 174 may be permanently bonded to the insulating layer 170. According to some embodiments, the screen layers 172, 174 are formed of conductive EPDM or LSR.

According to some embodiments, the each layer 170, 172, 174 has a Modulus at 100 percent elongation (M100) in the range of from about 0.65 to 3.5 MPa.

The cover system 101 may further include mastic 52 and a clamp ring 50 (FIG. 6; e.g., formed of metal).

The cable connector 60 may be formed of any suitable electrically conductive metal such as copper. The connector 60 includes a body 64 and a coupling portion or lug 62 extending from an end thereof. A bolt bore 62A is defined in the lug 62. A conductor bore 64A is defined in the body to receive the exposed end section of the conductor 42. Fasteners 65 secure the conductor 42 in the bore 64A.

Figure 5:
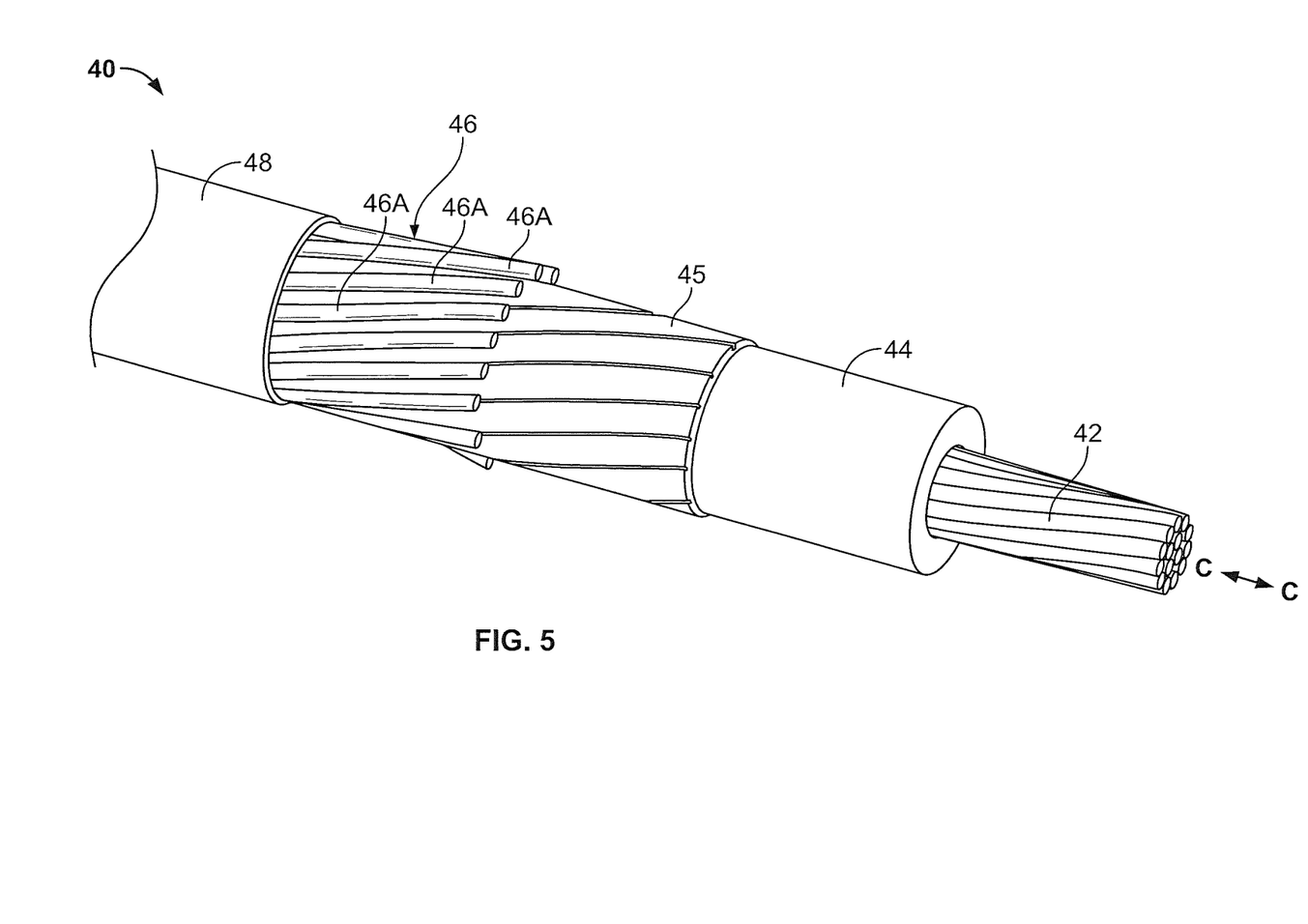
FIG. 5 is a perspective view of an exemplary cable for use with the pre-expanded unit of FIG. 1.

Referring now to FIGS. 5 and 6, the cover system 101 may be applied over a connection 5 (FIG. 6) between a connector 60 and an electrical power transmission cable 40 to form a cable termination 10. According to some embodiments, the cable 40 is a low-voltage or medium-voltage (e.g., between about 5 and 46 kV) power transmission cable. According to some embodiments, the cable 40 has a size in the range of from about 25 to 55 mm.

As shown in FIG. 5, the cable 40 includes a primary electrical conductor 42, a polymeric insulation layer 44, a semiconductor layer 45, a metal electromagnetic radiation shield layer 46, and a jacket 48, with each component being concentrically surrounded by the next. The cable 40 has a cable axis C-C.

According to some embodiments and as shown, the shield layer 46 includes individual concentric neutral wires 46A. The wires 46A may be longitudinally or helically wound about the semiconductor layer 45 along the length of the cable 40 and about the axis C-C, for example. In other embodiments, the shield layer 46 may is a metal tape, foil, strip or sheath fully circumferentially surrounding the semiconductor layer 45 along the length of the cable.

The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The shield layer 46 may be formed of any suitable material such as copper. The jacket 48 may be formed of any suitable material such as EPDM or PVC.

Referring now to FIG. 6, the protected connection assembly 10 may be constructed in the following manner using the system 101.

The cable is 40 prepared as shown in FIG. 5 such that a segment of each cable layer extends beyond the next overlying layer. The mastic 52 is wrapped about the jacket 48 adjacent the terminal end of the jacket 48. The wires 46A are folded back onto the jacket 48 and the mastic 52. The clamp ring 50 may be installed over the wires 46A to clamp the wires 46A to the jacket 48.

The end of the cable conductor 42 is inserted into the bore 64A of the connector 60 and secured by the fastener 65.

The pre-expanded unit 121 is then slid onto the cable 40 and into position over the cable insulation 44, the semiconductor layer 45, the neutral wires 46A, and the jacket 48. In some embodiments, the step 150 is substantially axially aligned with the terminal edge 48A of the jacket 48 of the cable 40 and the terminal edge 45A of the semiconductor layer is positioned in the passage 146 of the stress cone layer 140 (in some embodiments, at or near an axial midpoint in the passage 146). According to some embodiments, the inside diameter D6 of the holdout 110 is greater than the outer diameter of the cable 40 such that the inner diameter of the holdout 110 is sufficient to receive the prepared cable 40 without undue effort. According to some embodiments, the inner diameter D6 of the holdout 110 is at least as great as the outer diameter of the largest portion of the cable 40 that is to be received in the passage 126, including the folded over wires 46A.

Alternatively, the pre-expanded unit 121 may be retained or parked on the cable 40 until the operator is ready to install the cable adapter 120 on the cable 40, and the unit 121 is thereafter slid into position for deployment.

The holdout 110 is then removed from the cable adapter 120, thereby permitting the cable adapter 120 (i.e., the elastomeric sleeves 130, 140) to relax and radially retract about the cable 40. The spirally wound holdout 110 may be removed from the cable adapter 120 by pulling the draw cord or section 112A of the strip 112 from the end proximate the connector 60 back through the holdout inner passage 114 in a axial direction away from the connector 60, to thereby progressively unravel the holdout 110 (i.e., sequentially unravel each leading segment 116 of the strip 112) in known manner. In this way, the holdout 110 is axially progressively disintegrated or collapsed and the cable adapter 120 is permitted to axially progressively elastically radially contract onto the cable 40 from end 112B to end 112A. In this manner, the cable adapter 120 is cold-applied and cold shrunk onto the cable 40 without axially displacing the cable adapter 120 (i.e., without pushing the cable adapter axially onto the cable 40).

According to some embodiments, the deployed cable adapter 120 overlaps and engages the cable insulation 44, the semiconductor layer 45, the neutral wires 46A, and the jacket 48. According to some embodiments, the terminal edge of the semiconductor layer 45 abuts or nearly abuts the step face 150A.

According to some embodiments, the cable adapter 120 axially overlaps the cable semiconductor layer 45 by at least 12 mm and, according to some embodiments, by between about 10 and 15 mm. According to some embodiments, the cable adapter 120 axially overlaps the cable insulation layer 44 by at least 75 mm and, according to some embodiments, by between about 50 and 100 mm. According to some embodiments, the cable adapter 120 overlaps the jacket 48 by at least 40 mm and, according to some embodiments, between about 30 and 50 mm.

The relaxed inner diameter of the cable adapter section 152 is less than at least the outer diameter of the jacket layer 48 and the outer diameter of the semiconductor layer 45. The relaxed inner diameter of the cable adapter section 154 is less than at least the outer diameter of the semiconductor layer 45 and the outer diameter of the polymeric insulation layer 44. Therefore, the cable adapter 120 exerts a persistent radially inwardly compressive or clamping force or pressure (due to elastic tension) onto the cable 40. The cable adapter 120 may thereby effect a liquid tight seal at the interface between the cable 40 and the cable adapter 120. This seal can protect the cable and the connection from the ingress of environmental moisture. According to some embodiments, the relaxed inner diameter of the cable adapter 120 is between about 35 and 60 percent less than the smallest diameter cable upon which the cover assembly 100 is intended to be installed. According to some embodiments, the cable adapter 120 maintains a tension set in the range of from about 5 to 20 percent after two years at 50° C.

The elbow body 160 is then slid or pushed onto the cable 40, connector 60 and cable adapter 120 such that these components are received in the passage 166 and the cable 40 extends out through the opening 166A as shown in FIG. 6. More particularly, the cable adapter 120 is received in or overlapped by the end section 163 of the elbow body 160 so that the inner surface 163A engages the outer surface 120B of the cable adapter 120. In some embodiments, the screen layer 174 overlaps and engages the leading end of the cable adapter 120. The inner diameter (when relaxed) D5 of the end section 163 is less than the outer diameter (when installed) of the cable adapter 120, which provides an interference fit between the end section 163 and the cable adapter 120. According to some embodiments, the relaxed inner diameter D5 of the end section 163 is between about 1 and 8 mm less than the installed outer diameter of the cable adapter 120. As shown, a portion of the cable adapter 120 may extend axially outwardly from the elbow body 160.

The cable adapter 120 thus forms a seal about the cable 40 and also with the end section 163 of the elbow body 160. Accordingly, the engagement between the elbow body 160 and the cable adapter 120 environmentally seals the opening 166A to the passage 166. The cable adapter 120 serves to supplement or radially build up the effective diameter of the cable 40 to ensure a proper and consistent fitment between the elbow body 160 and cable 40. The geometry of the passage 126 through the cable adapter 120 can provide a good structured, conformal fit between the cable 40 and the cable adapter 120, thereby ensuring a good sealing engagement and contact between the stress cone layer 140 and the semiconductor layer 45 of the cable 40.

According to some embodiments, the cable adapter outer layer 130 is formed of LSR and the elbow body 160 (including the end section 163) is formed of EPDM.

It will be appreciated that the installed cover assembly 100 will function in known manner to electrically insulate and environmentally protect the connection. In use, the stress cone layer 140 may serve to redistribute the voltage along the surface of the cable insulation 44 to reduce or prevent the degradation of the insulation 44 that might otherwise occur.

Covering kits and methods of the present invention and as described herein can provide a number of advantages.

The pre-expanded unit 121 enables the cable adapter 120 to be more easily installed over large or bulky sections of the cable 40 as compared to push-on cable adapters. For example, the cable adapter 120 may allow for easier installation on shield break elbows, where cross-bonding of the neutral wires may present a larger outer diameter that the cable adapter must slide over and fit around.

A coldshrink cable adapter 120 can be designed to operatively fit a wider range of cable sizes, reducing the number of kit sizes that must be provided to fit a full range of cable sizes.

The high elasticity of the cable adapter 120 (e.g., LSR sleeve) enables the inner sleeve 130 to move with the cable 40 and not lose its seal when the elbow body (or other cover sleeve body) is bent. The coldshrink cable adapter 120 provides a high compressive force that continuously grips the cable 40 to likewise maintain the seal even when the cable 40 is bent. The cable adapter 120 can also be physically more compact than push-on EPDM cable adapters.

According to further embodiments of the invention, a cable adapter as described herein (e.g., the cable adapter 120) is used to supplement or build up the outer diameter of a cable and sealingly engage a cold-applied cover sleeve body other than an elbow body. For example, the cable adapter may be used with a cold-applied cover body to enclose a cable splice or other type of cable termination. Cable adapters as disclosed herein may also be used with other types of power transmission cables, such as oil impregnated paper-insulated lead covered cables (PILCs).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A cable adapter unit for building up an outer diameter of an electrical cable to facilitate fitment of a cold-shrinkable cover sleeve body on the electrical cable, the cable adapter unit comprising:
   a cold-shrinkable, tubular, elastomeric cable adapter defining a cable adapter through passage configured to receive the electrical cable, wherein the cable adapter includes:
      an integral, electrically conductive, tubular stress cone layer; and
      an electrically insulating, tubular outer layer integral with and surrounding the stress cone layer;
      wherein the stress cone layer and the outer layer each define a portion of the through passage; and
   a removable holdout mounted within the through passage and configured to be withdrawn therefrom, wherein the holdout maintains the cable adapter in an expanded state in which the cable adapter is elastically expanded and, when withdrawn from the through passage, permits the cable adapter to radially contract to a contracted state about the electrical cable;
   wherein:
      the cable adapter has a front section and a rear section;
      the through passage includes a front subpassage in the front section and a rear subpassage in the rear section; and
      when the cable adapter is in a relaxed, non-expanded state, the front subpassage has a first inner diameter and the rear subpassage has a second inner diameter greater than the inner diameter of the front subpassage.

2. The cable adapter unit of claim 1 wherein the holdout is configured to be removed from the through passage by disintegrating and/or collapsing the holdout within the cable adapter.

3. The cable adapter unit of claim 2 wherein the holdout includes a strip helically wound to form a rigid tube, and the holdout is configured to be removed from the through passage by axially progressively unraveling the helically wound strip, which permits the cable adapter to axially progressively radially contract about the electrical cable.

4. The cable adapter unit of claim 1 wherein the stress cone layer and the outer layer are each formed of silicone rubber.

5. The cable adapter unit of claim 1 wherein:
   the outer layer has a Modulus at 100 percent elongation in the range of from about 0.4 to 0.8 MPa; and
   the outer layer has an elongation at break of at least about 400 percent.

6. The cable adapter unit of claim 1 wherein the cable adapter has a substantially uniform outer diameter.

7. The cable adapter unit of claim 6 wherein the outer diameter of the cable adapter does not vary by more than 10 percent across the front and rear sections.

8. The cable adapter unit of claim 6 wherein the cable adapter defines a discrete step between the front and rear subpassages when in the relaxed, non-expanded state.

9. A cover system for use with an electrical cable to form a protected cable assembly, the cover system comprising:
   a) a cable adapter unit including:
      a cold-shrinkable, tubular, elastomeric cable adapter defining a cable adapter through passage configured to receive the electrical cable wherein the cable adapter includes:
         an integral, electrically conductive, tubular stress cone layer; and
         an electrically insulating, tubular outer layer integral with and surrounding the stress cone layer;
         wherein the stress cone layer and the outer layer each define a portion of the through passage; and
      a removable holdout mounted within the through passage and configured to be withdrawn therefrom, wherein the holdout maintains the cable adapter in an expanded state in which the cable adapter is elastically expanded and, when withdrawn from the through passage, permits the cable adapter to radially contract to a contracted state about the electrical cable; and
   b) a cold-shrinkable, tubular, elastomeric cover sleeve body defining a cover passage;
   wherein the cover sleeve body is configured to be mounted on the electrical cable such that the electrical cable and the cable adapter are received in the cover passage and the cover sleeve body sealingly engages the cable adapter; and
   wherein:
      the cable adapter has a front section and a rear section;
      the through passage includes a front subpassage in the front section and a rear subpassage in the rear section; and
      when the cable adapter is in a relaxed, non-expanded state, the front subpassage has a first inner diameter and the rear subpassage has a second inner diameter greater than the inner diameter of the front subpassage.

10. The cover system of claim 9 wherein the holdout is configured to be removed from the through passage by disintegrating and/or collapsing the holdout within the cable adapter.

11. The cover system of claim 10 wherein the holdout includes a strip helically wound to form a rigid tube, and the holdout is configured to be removed from the through passage by axially progressively unraveling the helically wound strip, which permits the cable adapter to axially progressively radially contract about the electrical cable.

12. The cover system of claim 9 wherein the stress cone layer and the outer layer are each formed of silicone rubber.

13. The cover system of claim 12 wherein:
   the outer layer has a Modulus at 100 percent elongation in the range of from about 0.4 to 0.8 MPa; and
   wherein the outer layer has an elongation at break of at least about 400 percent.

14. The cover system of claim 9 wherein the cable adapter has a substantially uniform outer diameter.

15. The cover system of claim 14 wherein the outer diameter of the cable adapter does not vary by more than 10 percent across the front and rear sections.

16. The cover system of claim 14 wherein the cable adapter defines a discrete step between the front and rear subpassages when in the relaxed, non-expanded state.

17. The cover system of claim 9 wherein the cover sleeve body is formed of EPDM.

18. The cover system of claim 9 wherein the cover sleeve body is formed of silicone rubber.

19. The cover system of claim 9 wherein the cover passage has an inner diameter less than a corresponding outer diameter of the cable adapter so that, when the cover sleeve body is mounted on the cable adapter, an interference fit is formed between the cable adapter and the cover sleeve body.

20. The cover system of claim 9 wherein the cover sleeve body is an elbow body.

21. A method for use with an electrical cable for forming a protected cable assembly, the method comprising:
   providing a cable adapter unit including:
      a cold-shrinkable, tubular, elastomeric cable adapter defining a cable adapter through passage configured to receive the electrical cable wherein the cable adapter includes:
         an integral, electrically conductive, tubular stress cone layer; and
         an electrically insulating, tubular outer layer integral with and surrounding the stress cone layer;
         wherein the stress cone layer and the outer layer each define a portion of the through passage; and
      a removable holdout mounted within the through passage and configured to be withdrawn therefrom, wherein the holdout maintains the cable adapter in an expanded state in which the cable adapter is elastically expanded and, when withdrawn from the through passage, permits the cable adapter to radially contract to a contracted state about the electrical cable;
   positioning the cable adapter unit on an electrical cable;
   withdrawing the holdout from the through passage to thereby release the cable adapter onto the electrical cable;
   providing a cold-shrinkable, tubular, elastomeric cover sleeve body defining a cover passage; and
   mounting the cover sleeve body on the electrical cable such that the electrical cable and the cable adapter are received in the cover passage and the cover sleeve body sealingly engages the cable adapter;
   wherein:
      the cable adapter has a front section and a rear section;
      the through passage includes a front subpassage in the front section and a rear subpassage in the rear section; and
      when the cable adapter is in a relaxed, non-expanded state, the front subpassage has a first inner diameter and the rear subpassage has a second inner diameter greater than the inner diameter of the front subpassage.

22. The method of claim 21 wherein:
   the cable adapter has a substantially uniform outer diameter; and
   the cable adapter defines a discrete step between the front and rear subpassages when in the relaxed, non-expanded state.

* * * * *